(12) United States Patent
Elmore et al.

(10) Patent No.: US 10,331,621 B1
(45) Date of Patent: Jun. 25, 2019

(54) SYSTEM AND METHOD FOR DISPLAYING A SAMPLE OF UNIFORM AND OUTLIER ROWS FROM A FILE

(71) Applicant: Trifacta, Inc., San Francisco, CA (US)

(72) Inventors: Aaron J. Elmore, Goleta, CA (US); Adam Eli Silberstein, Sunnyvale, CA (US); Joseph M. Hellerstein, Berkeley, CA (US); Sean Philip Kandel, San Francisco, CA (US)

(73) Assignee: TRIFACTA INC., San Francsico, CA (US)

( * ) Notice: Subject to any disclaimer, the term of this patent is extended or adjusted under 35 U.S.C. 154(b) by 754 days.

(21) Appl. No.: 14/491,956

(22) Filed: Sep. 19, 2014

Related U.S. Application Data

(60) Provisional application No. 61/880,046, filed on Sep. 19, 2013.

(51) Int. Cl.
 *G06F 16/16* (2019.01)
(52) U.S. Cl.
 CPC .................. *G06F 16/16* (2019.01)

(58) Field of Classification Search
 CPC .......................... G06F 17/30115; G06F 16/16
 USPC ........................................................ 707/737
 See application file for complete search history.

(56) References Cited

U.S. PATENT DOCUMENTS

| | | | | |
|---|---|---|---|---|
| 5,809,500 | A * | 9/1998 | Nolan ........................ | G06F 8/78 |
| 2003/0018615 | A1* | 1/2003 | Chaudhuri ........ | G06F 17/30536 |
| 2004/0068493 | A1* | 4/2004 | Kobayashi ........ | G06F 17/30713 |
| 2005/0080781 | A1* | 4/2005 | Ryan ................ | G06F 17/30873 |
| 2011/0167063 | A1* | 7/2011 | Tengli ............... | G06F 17/30864 |
| | | | | 707/737 |
| 2013/0174048 | A1* | 7/2013 | Xu ......................... | G06F 15/16 |
| | | | | 715/748 |
| 2014/0214838 | A1* | 7/2014 | Hendrey ........... | G06F 17/30598 |
| | | | | 707/737 |
| 2017/0140039 | A1* | 5/2017 | Neels ................. | G06F 17/30696 |

\* cited by examiner

*Primary Examiner* — Hicham Skhoun
(74) *Attorney, Agent, or Firm* — Fenwick & West LLP

(57) ABSTRACT

A system and method identifies rows in a file as uniform rows or outlier rows based on statistics from the file, and displays a sampling of uniform and outlier rows.

19 Claims, 4 Drawing Sheets

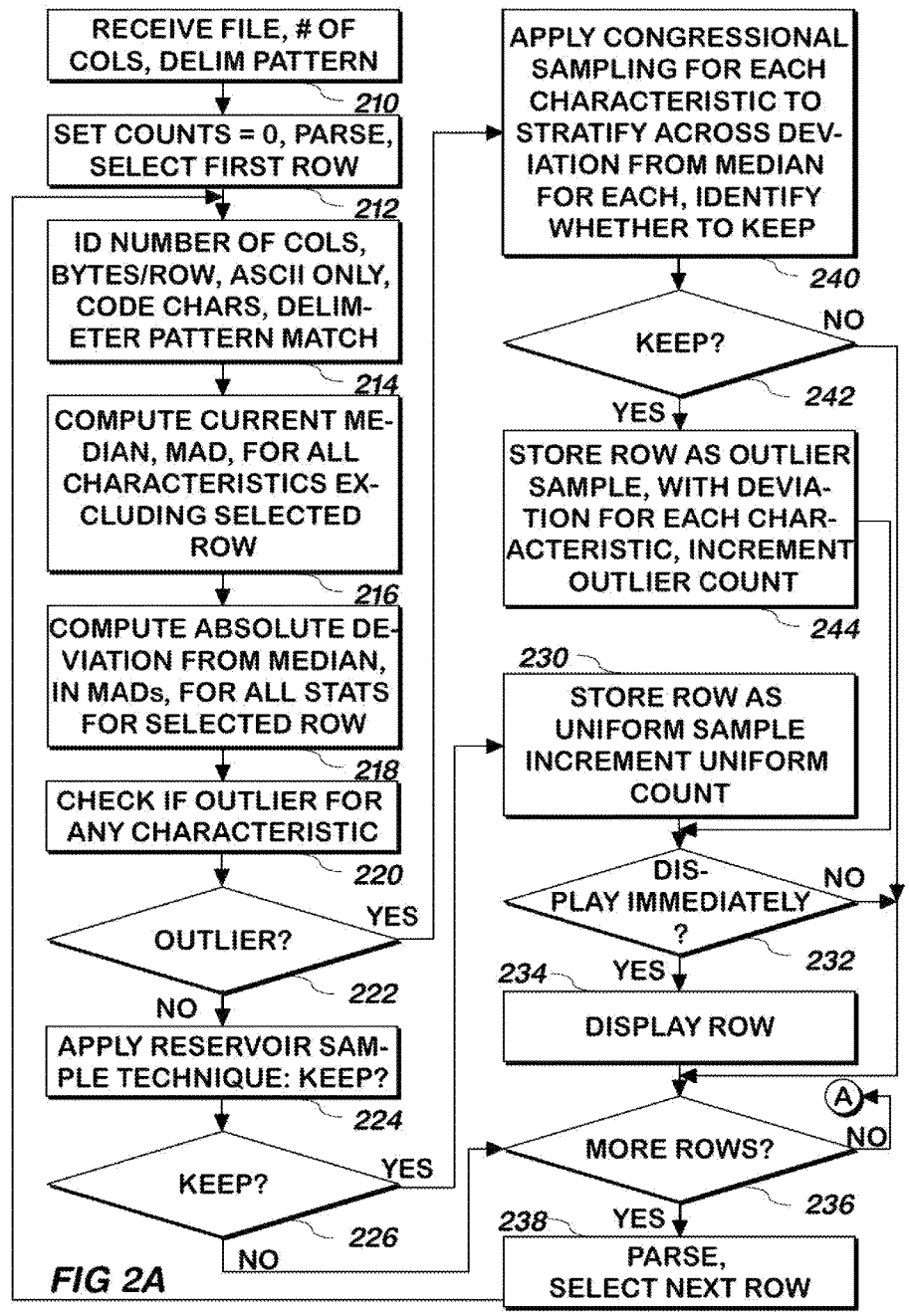

SYSTEM AND METHOD FOR DISPLAYING A SAMPLE OF UNIFORM AND OUTLIER ROWS FROM A FILE

RELATED APPLICATIONS

This application claims the benefit of U.S. Provisional Patent Application Ser. No. 61/880,046 entitled, "Method and Apparatus for Displaying a Sample of Uniform and Outlier Rows from a File," filed by Aaron J. Elmore, Adam E. Silberstein, Joseph M. Hellerstein, and Sean Kandel on Sep. 19, 2013, and is related to the subject matter of application Ser. No. 61/880,019 entitled, "Method and Apparatus for Identifying Delimiters in a Computer File" filed on Sep. 19, 2013 by Aaron J Elmore, Adam E. Silberstein, Joseph M. Hellerstein and Sean Kandel, and to U.S. patent application Ser. No. 14/491,953 entitled "Method and Apparatus for Identifying Delimiters in a Computer File" filed on Sep. 19, 2014 by Aaron J Elmore, Adam E. Silberstein, Joseph M. Hellerstein and Sean Kandel, each having the same assignee as this application, and each is hereby incorporated herein by reference in its entirety.

FIELD OF THE INVENTION

The present invention is related to computer software and more specifically to computer software for displaying information from a file.

BACKGROUND OF THE INVENTION

Files may be automatically processed, such as via a script or program. Such files may contain rows with different characteristics for which the script should be prepared, but may not be prepared. This is undesirable. What is needed is a system and method that can show a user rows of a file that are similar to many rows in the file and rows in the file that are dissimilar to many rows in the file.

SUMMARY OF INVENTION

A file containing rows of data is received, and each row is identified as a uniform row or an outlier row by comparing one or more characteristics of the row to expected values computed for prior rows or to expected values of one or more characteristics. Uniform rows are sampled, such as via a reservoir sampling technique to keep a subset of the uniform rows. Outlier rows are sampled (without replacement) via a congressional sampling technique to keep rows corresponding to different amounts of absolute deviation from the median for each characteristic, or other than expected values, of each characteristic. Some rows may be displayed immediately as they are being kept, for example rows that are, or can be, expected to be displayed as described below. The rows being kept may be prioritized in terms of the likelihood that such row will be displayed as described below, in view of the other rows being kept, with rows having a low likelihood of being displayed no longer being kept, for example, to conserve storage.

Characteristics producing a large percentage of outlier rows relative to the number of rows processed may be eliminated from consideration for outlier status, and any rows that would not have been kept were it not for such characteristic are no longer kept. Such determination may be made partway through the processing of the rows to provide additional speed of processing, lower storage requirements and to conserve display space, or such determination may be made after all rows have been processed to conserve storage and display space.

Some or all of the kept rows are displayed in a browser according to the space available in the browser. If there is sufficient space to display all of the rows, all such rows kept are displayed. Otherwise, a subset of the uniform rows, is randomly selected, subject to a minimum number of uniform rows and such rows are displayed. If there remains sufficient space to display the kept outlier rows, such outlier rows are displayed, and otherwise outlier rows having higher measure of absolute deviation from an expected amount for a given characteristic may be selected over outlier rows that were kept for such characteristic but which have a lower measure of absolute deviation from an expected amount of such characteristic, and only such selected kept outlier rows are displayed with the uniform rows. The first few rows or bytes of the file may also be displayed.

A user can change parameters to cause a higher or lower percentage of uniform or outlier rows to be displayed, or cause the first, few, last few, other designated, or other rows or bytes of the file to be displayed or not displayed.

DETAILED DESCRIPTION OF A PREFERRED EMBODIMENT

Figure 1:
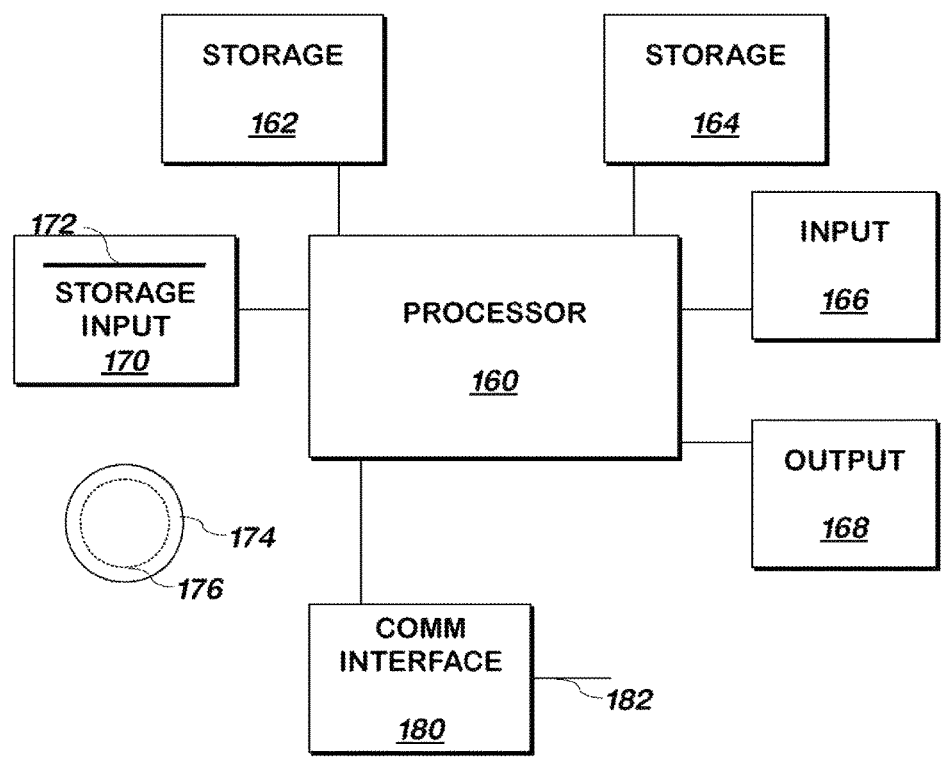
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2B:
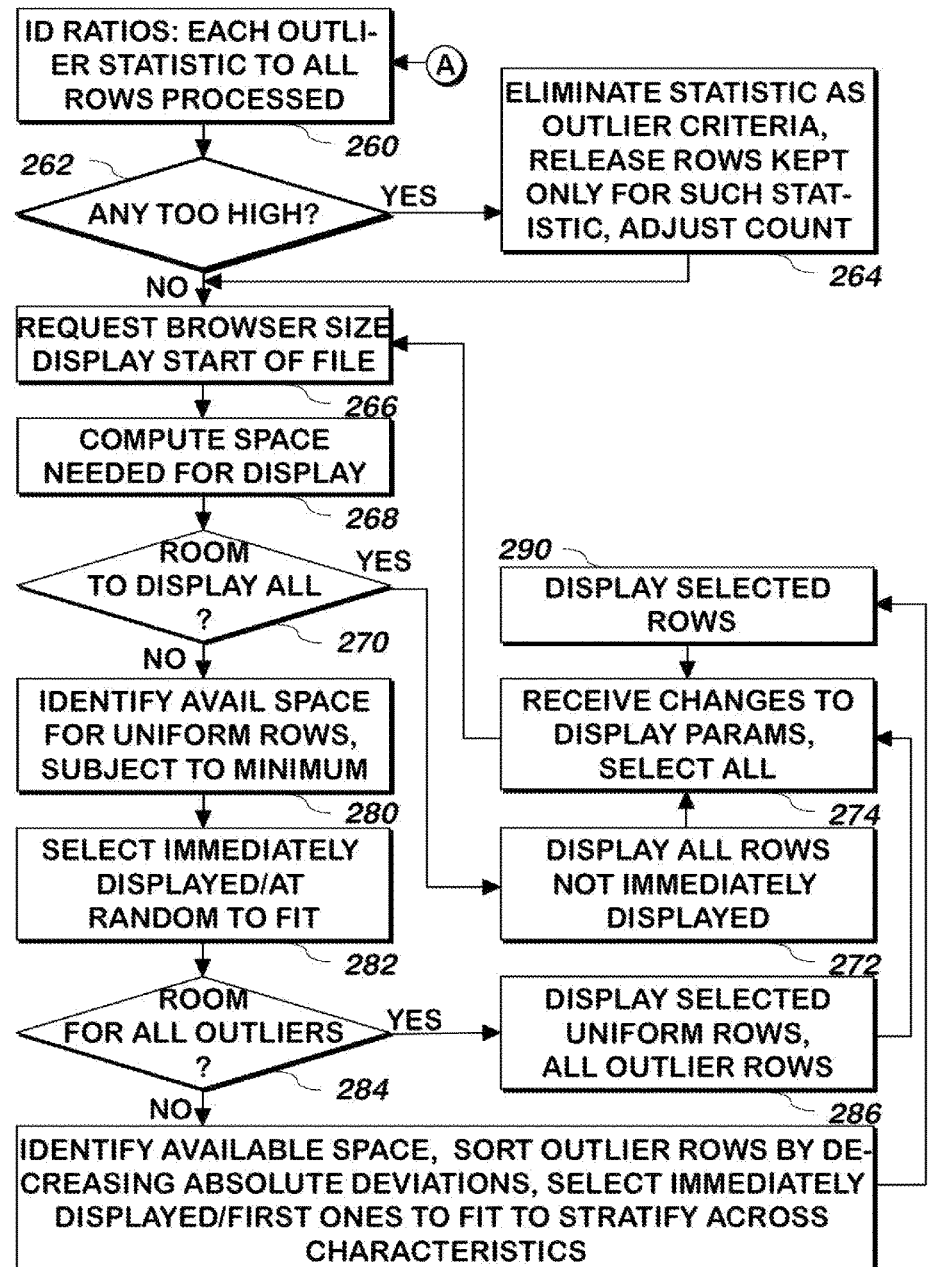
FIG. 2, consisting of FIGS. 2A and 2B, is a flowchart illustrating a method of displaying uniform and outlier subsets of file rows according to one embodiment of the present invention.

FIG. 2, consisting of FIGS. 2A and 2B, is a flowchart illustrating a method of displaying uniform and outlier subsets of file rows according to one embodiment of the present invention. Uniform subsets include rows having an expected, or median value of certain characteristics of the row with respect to prior rows in the file. Outlier subsets include rows having a different than expected or different than a median value of certain characteristics. Such differences may be greater than a threshold amount, which may be substantial.

A file, organized as rows and columns, an expected number of columns, and an expected delimiter pattern, is received 210. The expected delimiter pattern is a commonly used pattern of delimiters found in the file, such as is described in the related application. The expected number of columns, and delimiter pattern, may be identified as described in the related application.

The counts described below may be initialized to a value of zero, the file is parsed using the delimiters, and a first row of the file is selected 212. In one embodiment, the first row is the first row in the file identified between the start of the file and the first end of row delimiter, indicated by the delimiter pattern, and in another embodiment, the first row is the first row found in the file having delimiters that correspond to the pattern. The first row may be a row with delimiters that are found with the number of column delimiters equal to those in the pattern, and an end of row delimiter found after that many number of column delimiters.

Using the selected row, certain statistics are identified 214 from characteristics of the row, including the number of columns in the row, the number of bytes in the row, whether delimiters in the row delimiting the columns and end of row match those in the pattern exactly, whether the bytes correspond to ASCII characters only or other characters ("ASCII only" is true if some or all of the bytes in a row or a column correspond to ASCII characters only), whether the bytes correspond to code characters which are commonly used in code environments, but are uncommon outside of a code environment, such as '{', '}', or '[', ']', or other similar characters. Code may be computer code, a markup language such as XML or other command type languages, or output of a computer program, such as may be found in a log file. ("Code characters" is true if any or some or all of the bytes in a row or a column correspond to such code characters)

The current median and median absolute deviation for the number of columns and number of bytes in a row is computed 216 using some or all previously selected rows, excluding the selected row. These statistics are computed from numeric-based characteristics and therefore the median and median absolute deviation may be computed for them. Other statistics are computed from Boolean characteristics which are true or false, and their medians or expected values are considered to be default values. In one embodiment, the default values are ASCII only equals true, code characters equals false and delimiter pattern match equals true. Any row that does not have these default values is considered to have an absolute deviation of '1' for each such characteristics of the row.

The number of MADs from the median as computed in step 216 is computed or identified for all characteristics for the selected row 218. As noted above, Boolean characteristics are considered to be zero MADs from the median if the Boolean value for the row is equal to the default (i.e. an expected value) for that Boolean value, and otherwise the number of MADs from the median is computed as a value of one.

A determination is made if the selected row is an outlier row 220. In one embodiment, any row may be considered a uniform row or an outlier row. In one embodiment, the selected row is an outlier row if some of or any of the characteristics for that row is more than zero (or another threshold) MADs from the median, or if a function of one or more deviations from an expected or median value of any one or more characteristics exceeds a threshold, and the selected row is a uniform row otherwise. If the selected row is an outlier 222, the method continues at step 240.

If the selected row is not an outlier 222, a conventional reservoir sampling technique is applied 224 to determine whether or not to keep the selected row. If the sampling technique determines that the row should be kept 226, the row is stored as a uniform sample and a uniform count is incremented 230. The uniform count maintains the number of rows identified as non-outlier rows. If the sampling technique determines that the row should not be kept 226, the method continues at step 236, as described below.

In one embodiment, a determination is made in step 230, as to whether or not the selected row being kept should be displayed immediately. In one embodiment, a uniform row should be displayed immediately if the number of uniform rows already being displayed is less than a minimum number of uniform rows. If the row should be displayed immediately 232, the row is displayed 234, and the method continues at step 236. If there are more rows in the file 236, the file is parsed using the delimiter pattern and the next row is selected 238, and the method continues at step 214 using the newly selected row.

At step 240, conventional congressional sampling techniques are used for each characteristic to keep samples stratified across different numbers of MADs for each characteristic. If the sampling technique determines that the row should be kept 242, the row is stored as an outlier sample, with the number of MADs away from the median for each characteristic computed as described above 244. A count of the outliers is incremented as part of step 244.

In one embodiment, congressional sampling is performed "without replacement", meaning a row having more than one characteristic different from the median or expected value is stored only one time instead of once for each such characteristic.

In one embodiment, a determination is made in step 240, as to whether or not the selected row being kept should be displayed immediately. In one embodiment, an outlier row should be displayed immediately if it has a numeric-based characteristic that has an absolute deviation from the median or expected value greater than a threshold number, such as three median absolute deviations or 1.4826 median absolute deviations; or if any Boolean characteristic for which the outlier row has an absolute deviation other than zero is also exhibited by less than a threshold number of prior outlier rows with a deviation from the median or expected value for that characteristic that is other than zero and that was also displayed immediately. Absolute deviation is an absolute value of the deviation, so for example, if a median is 3 for a given characteristic, a row having a value of 4 for that characteristic has an absolute deviation of 1, the same as that of a row having a value of 2 for that characteristic.

In another embodiment, no rows kept are displayed immediately, and so step 236 follows steps 230 and 244.

The method continues at step 232. If the sampling technique determines that the row should not be kept 242, the method continues at step 236.

In one embodiment, a storage criteria is added to determine whether or not to keep a row in steps 224 and 240. Factors in determining whether to keep a uniform row include the number of uniform rows already kept, and the number of outlier rows already kept. If either the uniform rows already kept exceeds a first threshold, or the total number of uniform rows and outlier rows exceeds a second threshold, an additional uniform row is not kept. If the number of outlier rows exceeds a threshold, then an additional outlier row may be kept only if a previous outlier row being kept does not contain a similar amount of MADs away from the median for each characteristic that the additional outlier row has that is not at the median or expected value. In one embodiment, a similar amount of MADs corresponds to a range of MADs, such as 0 to 1, 1 to 2, etc.

Although rows are described as being processed one at a time, in one embodiment, steps 224 through 230, and steps 240 through 244 each process a batch of rows together, and may process all uniform or outlier rows together. Steps 232 and 234 may be performed after each iteration of steps 230 and 244 in the batch.

If there are no more rows 236, the method continues at step 260 of FIG. 2B.

At step 260, a determination is made as to whether rows identified as outlier rows represent more than a threshold percentage of the rows of the file so that they should not be treated as outlier rows. To make this determination, a ratio of outlier rows having a deviation from the median or expected value for a characteristic that is other than zero, to the number of all rows processed in step 240 is identified for each characteristic. If the ratio for a characteristic is above a threshold (e.g. 1:1) 262, the characteristic is eliminated as a criteria that is to identify an outlier row for the file. Rows that are kept as outlier rows only for such characteristic or those that would not be kept were it not for such characteristic are not kept as outlier rows, the outlier count is adjusted accordingly 264, and the method continues at step 266. Otherwise 262, the method continues at step 266. Steps 260 through 262 may be performed after steps 240 through 244, or they may be performed after the iterations of step 240 have processed a threshold number of rows. In the latter embodiment, when the characteristic is eliminated as an outlier criteria, the congressional sampling of such characteristics need not be performed for subsequent rows being processed by step 240 and optionally, the identification of statistics for such characteristics need not be computed.

The size of the browser window is requested from the browser and received and the beginning of the file is optionally displayed in the browser 266. In one embodiment, the beginning of the file is the first few lines of the file, or the first few bytes of the file. The browser size may be converted to a number of lines that may be displayed in the browser of that size as part of step 266. Space needed to display the kept rows described above is computed 268, for example, using the counts, if each row is displayed on one browser line. If there is room in the browser to display all of the kept rows 270, the kept rows not already immediately displayed as described above are displayed in the browser with such immediately displayed rows 272 and the method continues at step 274.

At step 274, changes to display parameters may be received. Display parameters may include how much, if any, of the start of the file is displayed, and information from which the ratio of uniform rows to outlier rows displayed may be identified. As part of step 274, rows not selected in steps 282 and 288, described below may be selected. The method continues at step 266, using the display parameters received. In one embodiment, an initial value of display parameters is provided to the user, or is received from the user at any point prior to step 270.

If there is not room to display all of the kept rows 270, available space for uniform rows is identified, for example using the display parameters 280. In one embodiment, one of the display parameters may be a minimum number of uniform rows that are to be displayed. In such embodiment, the available space for uniform samples is the space not being used by the outlier samples, but not less than the minimum number of uniform rows. Uniform rows previously immediately displayed are selected, plus any additional uniform rows that are sufficient to fill the identified available space for such rows are selected at random from the remaining kept uniform rows, for display 282. If there is also sufficient room in the browser window to display all of the outliers kept 284, the uniform rows selected and all outlier rows kept are displayed in the browser 286 and the method continues at step 274.

If there is not room to display all of the kept outlier rows 284, available space for the outlier rows is identified, and the outlier rows are sorted in decreasing order of the sum of the absolute deviations, in MADs, for each kept outlier row, and a selection process is performed to select the outlier rows that will be displayed 288. The selection process may include selecting rows that were immediately displayed, and then, if space is available, selecting the rows in sorted order while attempting to stratify the selections so that the outlier rows displayed will have at least one row with an absolute deviation from the expected or median that is greater than zero, for all characteristics.

As described above, the rows immediately displayed remain displayed, and additional rows, if any are added to the display to fill the browser window, if possible, without scrolling. In another embodiment, scrolling is permitted. In one embodiment, the selection of immediately displayed rows in steps 282 and 288, and the exception for the display of already immediately displayed rows of step 272, are not performed following step 274. Thus immediately displayed rows continue to be displayed for certain, only during the first iteration of steps 266 through 290.

The description of individual characteristics described herein may be replaced with functions of multiple characteristics in one embodiment of the present invention. Thresholds and tolerances may be applied to any or all of the descriptions herein.

Delimiters described herein may be explicit or implied. For example, the columns of a relational database may be processed as described herein as if the delimiters are between them even though the columns were retrieved separately. In such embodiment, column delimiters are implied between each column and a row delimiter is implied at the end of each row.

The distinction between outlier rows and uniform rows may incorporate other or different characteristics than those described herein.

System.

The system may be implemented by a computer containing one or more processors coupled to one or more memories such as conventional memory or disk storage, and the elements of the system below are not human actors.

Figure 3:
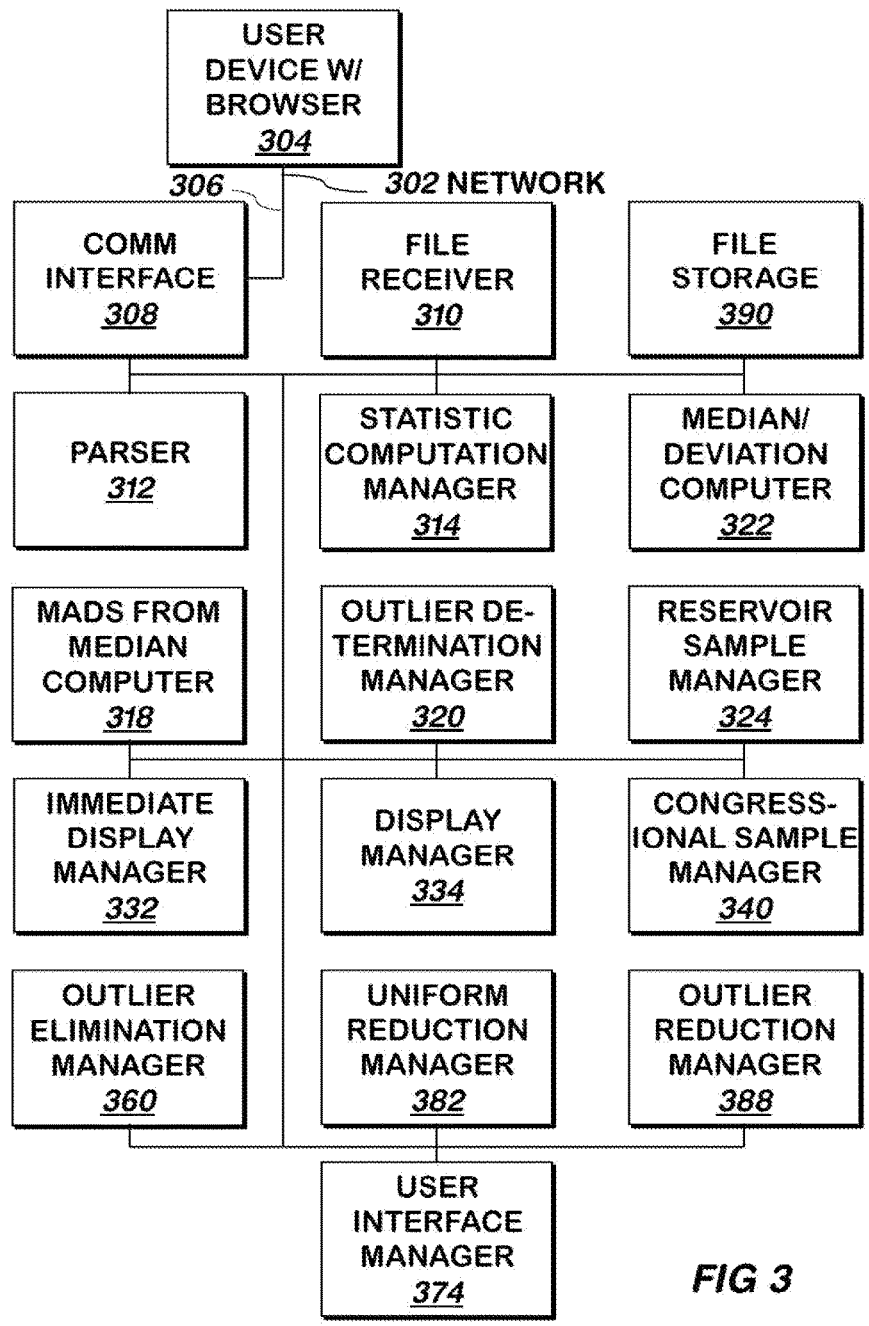
FIG. 3 is a block schematic diagram of a system for displaying uniform and outlier subsets of file rows according to one embodiment of the present invention.

Referring now to FIG. 3, a system for identifying and displaying uniform and outlier rows from a file is shown according to one embodiment of the present invention.

Communication interface 308 includes a conventional communication interface running suitable communication protocols such as Ethernet, TCP/IP, or both. In one embodiment, unless otherwise noted herein, all communication in or out of the system of FIG. 3 is made via input/output 306 of communication interface 308. Input/output 306 may be coupled to an Ethernet, the Internet, or both.

File receiver 310 receives the file as described above, along with an expected number of columns in each row, and a delimiter pattern as described above and in the related application. The delimiter pattern identifies row and column delimiters, and optionally string delimiters, each being made up of one or more characters in the file. File receiver 310 stores the file and such received information into file storage 390, and signals parser 312.

When signaled, parser 312 initializes to zero the counters described herein in file storage 390, parses the file using the delimiters from the pattern stored in file storage 390, and selects the first row. As parser 312 is parsing the file, it may encounter a larger than expected number of columns in any row, however parser 312 will simply parse each column and row according to the delimiters in the pattern in file storage 390. In one embodiment, parsing a file involves replacing the delimiter characters with tokens that indicate an end of a column, end of a row, or beginning or end of a string. In one embodiment, parser 312 parses the entire file and signals statistic computation manager 314. In another embodiment, parser 312 parses one row of the file at a time, and then signals statistic computation manager 314 with the row identifier such as the row number, and such embodiment will now be described.

When signaled, statistic computation manager 314 identifies the statistics for the row described above, such as the number of columns, the number of bytes in the row, whether the row contains characters other than ASCII, whether the row contains code characters, and whether the delimiter pattern matches the delimiters in the row as described above, and stores such statistics associated with the identifier of the row in file storage 390. Statistic computation manager 314 signals median/deviation computer 316 with the row identifier it received.

When signaled, median/deviation computer 360 computes the current median and median absolute deviation for each of the characteristics, using the statistics for all rows for which such statistics have been computed, stored in file storage 390. Median/deviation computer 360 stores the results in file storage 390 replacing any prior medians and meeting absolute deviations stored therein.

Median/deviation computer 360 signals MADs from median computer 318 with the row identifier it received.

When signaled, MADs from median computer 318 computes a measure of a deviation from a median or expected value, such as the number of MADs from the median or expected value for all characteristics of the row whose identifier it receives using the statistics computed for the row whose identifier it receives, and the current median and median absolute deviation stored in file storage 390, as described above. MADs from median computer 318 then signals outlier determination manager 320 with the row identifier it received.

When signaled, outlier determination manager 320 identifies whether the row corresponding to the identifier it received is an outlier row as described above. If so, outlier determination manager 320 marks the row in file storage 390 as an outlier row, and otherwise marks the row as a uniform row.

In one embodiment, as is described herein, outlier determination manager 320 then signals parser 312, which signals reservoir sample manager 324 and congressional sample manager 340, optionally with the row identifier that indicates how many rows have been parsed thus far, and if there are more rows, parses the next row as described above, and signals statistic computation manager 314 with the identifier of the next row it parses, which repeats the process described herein for the newly parsed row. If there are no more rows in the file, parser 312 signals outlier elimination manager 360 with the number of rows it parsed. In one embodiment, parser 312 signals the sample managers 324, 340 only after each N rows have been parsed and after there are no more rows.

When signaled, reservoir sample manager 324, using the information stored in file storage 390, performs the reservoir sampling technique described above for rows marked as uniform rows, identified as described above and marks the rows to keep in file storage 390. In one embodiment, as more rows are parsed as described herein, reservoir sample manager 324 may increase the total number of rows marked as rows to keep, though some rows previously marked as rows to keep may be unmarked as rows to keep by reservoir sample manager 324. Reservoir sample manager 324 signals immediate display manager 332 with an indication to initiate the immediate display of certain uniform rows marked to keep as described above, and the number of rows parsed.

When signaled, congressional sample manager 340, using the information stored in file storage 390, performs the congressional sampling technique described above for rows marked as outlier rows and identifies as described above and marks the rows to keep in file storage 390. In one embodiment, as more rows are parsed as described herein, congressional sample manager 340 may increase the total number of rows marked as rows to keep, though some rows previously marked as rows to keep may be unmarked as rows to keep by congressional sample manager 340. Congressional sample manager 340 signals immediate display manager 332 with an indication to initiate the immediate display of certain outlier rows marked to keep as described above, and the number of rows parsed.

When signaled, immediate display manager 332 determines which rows marked to keep that correspond to the indication received (e.g. uniform rows or outlier rows), if any, to immediately display as described above, and marks such rows in file storage 390 as rows that should be immediately displayed. Immediate display manager 332 may mark more such rows as more rows are parsed. Immediate display manager 332 may unmark some rows it no longer determines should be immediately displayed. Immediate display manager 332 signals display manager 334, which displays in a browser on a user device 304 coupled to communication interface 308 via input/output 306 and network 302 such as an Ethernet or the Internet, the rows so marked as rows that should be immediately displayed in file storage 390.

When signaled, outlier elimination manager 360 identifies the ratios described in step 260 above: for each characteristic, outlier elimination manager 360 identifies the ratio of the number of rows with corresponding statistics indicating that the row is an outlier, to the number of all the rows parsed. If any ratio exceeds a threshold, which may be the same or different for each characteristic, the characteristic is eliminated from consideration for determining whether a row is an outlier. Rows that are outliers only because of such characteristics, are unmarked as an outlier row, and may be marked as a uniform row in one embodiment.

In one embodiment, if a row is marked as an outlier row and such mark is removed by outlier elimination manager 360, in one embodiment, such rows are remarked by outlier elimination manager 360 as uniform rows, and outlier elimination manager signals reservoir sample manager 324, which unmarks the uniform rows marked to keep, resamples the uniform rows in the file and marks the rows to keep as described above. Outlier elimination manager 360 then signals display manager 324. If no outlier rows are eliminated by outlier elimination manager 360, outlier elimination manager signals display manager 324.

When signaled by outlier elimination manager 360, or by reservoir sample manager 324 in the embodiment in which eliminated outlier rows are resampled as described above, display manager 324 requests a size of a browser being used by a user, and displays the start of the file as described above. All displays by display manager 334 are made via the user's browser. Display manager 334 computes the space needed to display all of the rows marked to keep in file storage 390, and if there is sufficient space to display all such rows, in one embodiment, display manager 334 displays the rows marked to keep that are not marked as rows to be immediately displayed, because such rows are already displayed. In another embodiment, display manager 334 removes the display of such immediately displayed rows and displays all rows marked to keep in file storage 390.

If there is insufficient room in the user's browser to display all of the rows marked to keep, display manager 334 signals uniform reduction manager 382 with the space available to display uniform rows. In one embodiment, the space available in the browser to display uniform rows is a function of a set of display parameters, which may have default values, and are stored in file storage 390, as well as the size of the browser identified by display manager 334 as described above. Display manager 334 uses such information when identifying the space available to display uniform rows, optionally subject to a minimum as described above. The user may change such parameters at any time as described below.

When signaled with the space available to display uniform rows, uniform reduction manager 382 identifies a set of uniform rows to continue to keep, and marks as unincluded the uniform rows that were marked to keep that are not in the set it identifies. In one embodiment, uniform reduction manager 382 first attempts to include in the set of uniform rows to continue to keep, any uniform rows that are marked as rows that should be immediately displayed. If there is insufficient space to display all such rows, in one embodiment, uniform reduction manager 382 selects the first such rows to place in the set, and unmarks all other rows in file storage 390 as unincluded. If there is space for all such rows, uniform reduction manager 382 additionally selects at random the rows marked to keep to include in the set that it identifies. Uniform reduction manager 382 then signals display manager 324.

When signaled, display manager 324 identifies whether there is sufficient room to display all of the outlier rows marked to keep. Display manager 324 may use the display parameters stored in file storage 392 and the size of the browser to make such determination. If there is sufficient room to display all such outlier rows, display manager 324 displays the uniform rows marked to keep that are not marked as rows that are unincluded and displays all outlier rows marked to keep. Otherwise, display manager 324 uses the identified room for the outlier rows to be displayed to signal outlier reduction manager 388 with the amount of room for outlier rows to be displayed. Display manager 324 identifies the room for the outlier rows using the display parameters stored in file storage 390, and the size of the browser.

When so signaled, outlier reduction manager 388 sorts the outlier rows marked to keep in order of decreasing total MADs and then selects a set of outlier rows to continue to keep. In one embodiment, outlier reduction manager 388 selects the outlier rows to continue to keep by first selecting the outlier rows marked to keep that were also marked as rows to be immediately displayed. If there is insufficient room to display such rows, outlier reduction manager 388 selects such outlier rows in order to stratify the outlier rows in the set across the characteristics, so that the number of outlier rows that are outlier rows due to each characteristic are approximately equal in number. In one embodiment, when counting rows that are outliers for each characteristic for purposes of stratifying, rows that are outliers for more than one characteristic are counted for each such characteristic. If there is sufficient room to display all such rows, outlier reduction manager 380 selects the rows marked as outliers and rows to keep that were not marked as rows to be immediately displayed so as to stratify across the various characteristics, all such rows in the set. Outlier reduction manager 380 marks in file storage 390 the outlier rows not in the set as unincluded. Outlier reduction manager 380 signals display manager 324.

When signaled, display manager 324 displays in the browser all rows marked to keep that are not marked as rows that are unincluded.

At any time, the user may use a user interface that is displayed by user interface manager 374 in the browser or otherwise available to the user, to change the display parameters. When it receives such changes, user interface manager 374 stores such changes in file storage 390, unmarks rows marked as unincluded (i.e. removes such marks) and signals display manager 324, which repeats the process described above.

In one embodiment, instead of immediately displaying some rows as they are identified and then automatically displaying some or all additional rows marked to keep as described above, the additional rows marked to keep but not immediately displayed are displayed when the user requests such additional rows, or after an amount of time has elapsed. Display manager 334 may manage the timer or provide a user interface via the user's browser to receive the request for additional rows.

In one embodiment, reduction of uniform and/or outlier rows need not be performed as described above, as rows may be displayed to fill the available space, and then additional rows may be displayed in their place, using the space available for uniform rows for uniform rows and the space available for outlier rows for the outlier rows. For example, if there is room to display 5 outlier rows, but ten outlier rows are marked to keep, the first 5 outlier rows are displayed and then the next 5 outlier rows are displayed in place of the first five rows. In one embodiment, uniform rows may be reduced to fit the available space as described above, but outlier rows are displayed by cycling through them, and in another embodiment, the cycling through is performed for both types of rows. In such embodiment, display manager 334 cycles through the display of rows, either using a timer to automatically cycle each set after a fixed amount of time has elapsed, or via one or more user input elements, such as a button, it displays in the user's browser, to allow the user to indicate to cycle through the next set for each type being cycled through. Such cycling may be used after the immediately displayed rows are displayed or may be used instead of displaying immediately displayed rows, for example, by treating all rows marked to keep as rows to be immediately displayed as described above.

SUMMARY

A method of displaying uniform and outlier samples of a plurality of portions of a file is described, including receiving at least one portion delimiter that each delimits at least some of the plurality of portions of the file; identifying a criteria for classifying each of the plurality of portions of the file as one of a plurality of uniform portions of the file or one of a plurality of outlier portions of the file, responsive to fewer than all of the file and the at least one portion delimiter; classifying at least some of the portions of the file as at least some of the plurality of the uniform portions of the file and as at least some of the plurality of the outlier portions of the file responsive to the at least one criteria identified; sampling, using a first sampling technique, the at least some of the uniform portions of the file classified; sampling, using a second sampling technique, the at least some of the outlier portions of the file classified; displaying at least some of the plurality of uniform portions of the file sampled; and displaying at least some of the outlier portions of the file sampled.

The method includes an optional feature, whereby at least one of the sampling techniques comprises congressional sampling, without replacement.

The method includes an optional feature, whereby at least one of the displaying steps comprises determining whether one of the sampled at least some of the outlier or uniform portions of the file should be displayed before other of the plurality of the portions of the file have been classified, and displaying said one of the plurality of the portions of the file responsive to said determining.

The method includes an optional feature, whereby, responsive to the one of the sampled at least some of the outlier or uniform portions of the file being classified as a uniform portion of the file, the determining step comprises identifying whether a threshold measure of the at least some of the uniform portions of the file have been displayed; and the displaying the one of the plurality of the portions of the file responsive to said determining is responsive to said identifying.

The method includes an optional feature, whereby, responsive to the one of the sampled at least some of the outlier or uniform portions of the file being classified as an outlier portion of the file, the determining step comprises identifying whether a deviation of a numeric-based characteristic of the one of the sampled at least some of the outlier portions of the file relative to a plurality of other of the portions of the file exceeds a threshold measure; and the displaying the one of the plurality of the portions of the file responsive to said determining is responsive to said identifying.

The method includes an optional feature, whereby, responsive to the one of the sampled at least some of the outlier or uniform portions of the file being classified as an outlier portion of the file, the determining step comprises identifying whether a deviation of a Boolean-based characteristic of the one of the sampled at least some of the outlier portions of the file is exhibited by less than a threshold number of other of the plurality of portions of the file being displayed; and the displaying the one of the plurality of the portions of the file responsive to said determining is responsive to said identifying.

A system for displaying uniform and outlier samples of a plurality of portions of a file is described, the system including a file receiver having an input for receiving at least some of the file and for receiving at least one portion delimiter that each delimits at least some of the plurality of portions of the file, the file receiver for providing at an output the at least the some of the file received at the file receiver input and the at least one portion delimiter received at the input; a median/deviation computer having an input coupled to the file receiver output for receiving the at least the some of the file received at the file receiver input and the at least one portion delimiter, the median/deviation computer for identifying at least one criteria for classifying each of the plurality of portions of the file as one of a plurality of uniform portions of the file or one of a plurality of outlier portions of the file, responsive to fewer than all of the plurality of the portions of the file in the at least some of the file received at the median/deviation computer input and the at least one portion delimiter received at the median/deviation computer and for providing the at least one criteria at an output; an outlier determination manager having an input coupled to the median/deviation computer output for receiving the at least one criteria, the outlier determination manager for classifying at least some of the portions of the file as at least some of the plurality of the uniform portions of the file and as at least some of the plurality of the outlier portions of the file responsive to the at least one criteria received at the outlier determination manager input and for providing at an output classifications of the at least some of the plurality of the uniform portions of the file and as at least some of the plurality of the outlier portions of the file a first sample manager having an input coupled to the outlier determination manager for receiving the classifications and to the file receiver output for receiving the at least some of the file, the first sample manager for sampling, using a first sampling technique, the at least some of the uniform portions of the file responsive to the classifications and for providing at an output at least one indication of the sampled at least some of the uniform portions of the file classified; a second sample manager having an input coupled to the outlier determination manager for receiving the classifications and to the file receiver output for receiving the at least some of the file, the second sample manager for sampling, using a second sampling technique, the at least some of the outlier portions of the file responsive to the classifications, and for providing at an output at least one indication of the sampled at least some of the outlier portions of the file classified; and a display manager having an input coupled to the first sample manager and the second sample manager for receiving the at least one indications and to the file receiver output for receiving the at least some of the file, the display manager for displaying at least some of the plurality of uniform portions of the file sampled and for displaying at least some of the outlier portions of the file sampled, responsive to the indications and the at least some of the file.

The system includes an optional feature whereby the second sampling technique used by the second sampling manager comprises congressional sampling, without replacement.

The system may optionally additionally include an immediate display manager coupled to the first sample manager and the second sample manager for receiving the at least one indications and to the file receiver output for receiving the at least some of the file, the immediate display manager for making a determination whether one of the sampled at least some of the outlier or uniform portions of the file should be displayed before other of the plurality of the portions of the file have been classified, and for providing at an output an indication of such determination; and the system includes an optional feature whereby the display manager input is additionally coupled to the immediate display manager output for receiving the indication of the determination, and the display manager displays the one of the sampled at least some of the outlier or uniform portions of the file responsive to the indication of the determination.

The system includes an optional feature, whereby the immediate display manager makes the determination in response to the one of the sampled at least some of the outlier or uniform portions of the file being classified as a uniform portion of the file, responsive to whether a threshold measure of the at least some of the uniform portions of the file have been displayed.

The system includes an optional feature, whereby the immediate display manager makes the determination in response to the one of the sampled at least some of the outlier or uniform portions of the file being classified as an outlier portion of the file, responsive to whether a deviation of a numeric-based characteristic of the one of the sampled at least some of the outlier portions of the file relative to a plurality of other of the portions of the file exceeds a threshold measure.

The system includes an optional feature, whereby the immediate display manager makes the determination in response to the one of the sampled at least some of the outlier or uniform portions of the file being classified as an outlier portion of the file, responsive to whether a deviation of a Boolean-based characteristic of the one of the sampled at least some of the outlier portions of the file is exhibited by less than a threshold number of other of the plurality of portions of the file being displayed.

A computer program product comprising a computer useable medium having computer readable program code embodied therein for displaying uniform and outlier samples of a plurality of portions of a file is described, the computer program product including computer readable program code devices configured to cause a computer system to receive at least one portion delimiter that each delimits at least some of the plurality of portions of the file; identify a criteria for classifying each of the plurality of portions of the file as one of a plurality of uniform portions of the file or one of a plurality of outlier portions of the file, responsive to fewer than all of the file and the at least one portion delimiter; classify at least some of the portions of the file as at least some of the plurality of the uniform portions of the file and as at least some of the plurality of the outlier portions of the file responsive to the at least one criteria identified; sample, using a first sampling technique, the at least some of the uniform portions of the file classified; sample, using a second sampling technique, the at least some of the outlier portions of the file classified; display at least some of the plurality of uniform portions of the file sampled; and display at least some of the outlier portions of the file sampled.

The computer program product includes an optional feature, whereby at least one of the sampling techniques comprises congressional sampling, without replacement.

The computer program product includes an optional feature, whereby at least one of the computer readable program code devices configured to cause the computer system to display comprises the computer readable program code devices configured to cause the computer system to determine whether one of the sampled at least some of the outlier or uniform portions of the file should be displayed before other of the plurality of the portions of the file have been classified; and the computer readable program code devices configured to cause the computer system to display said one of the plurality of the portions of the file are responsive to said determining.

The computer program product includes an optional feature, whereby, responsive to the one of the sampled at least some of the outlier or uniform portions of the file being classified as a uniform portion of the file, the computer readable program code devices configured to cause the computer system to determine comprises computer readable program code devices configured to cause the computer system to identify whether a threshold measure of the at least some of the uniform portions of the file have been displayed; and the computer readable program code devices configured to cause the computer system to display the one of the plurality of the portions of the file responsive to said determining are responsive to the computer readable program code devices configured to cause the computer system to identify.

The computer program product of claim 15 wherein: responsive to the one of the sampled at least some of the outlier or uniform portions of the file being classified as an outlier portion of the file, the computer readable program code devices configured to cause the computer system to determine comprise computer readable program code devices configured to cause the computer system to identify whether a deviation of a numeric-based characteristic of the one of the sampled at least some of the outlier portions of the file relative to a plurality of other of the portions of the file exceeds a threshold measure; and the computer readable program code devices configured to cause the computer system to display the one of the plurality of the portions of the file responsive to said determining are responsive to the computer readable program code devices configured to cause the computer system to identify.

The computer program product includes an optional feature, whereby, responsive to the one of the sampled at least some of the outlier or uniform portions of the file being classified as an outlier portion of the file, the computer readable program code devices configured to cause the computer system to determine comprise computer readable program code devices configured to cause the computer system to identify whether a deviation of a Boolean-based characteristic of the one of the sampled at least some of the outlier portions of the file is exhibited by less than a threshold number of other of the plurality of portions of the file being displayed; and the computer readable program code devices configured to cause the computer system to display the one of the plurality of the portions of the file responsive to said determining are responsive to the computer readable program code devices configured to cause the computer system to identify.

What is claimed is:

1. A method of displaying data of a file via a user interface, comprising:
   receiving a delimiter that delimits at least some of a plurality of rows of the file, each row of the file associated with values corresponding to a plurality of characteristics;
   for each of the plurality of characteristics of rows of the file, determining an aggregate value of the characteristic by aggregating characteristic values corresponding to each row of a set of rows corresponding to at least a portion of the plurality of rows of the file;
   identifying a criteria for classifying each of the plurality of rows of the file as one of a uniform row or an outlier row, the criteria comprising a comparison of each of one or more characteristic values of the row of the file with the corresponding aggregate value of the characteristic;
   classifying at least some of the plurality of rows of the file based on the identified criteria to determine a plurality of uniform rows of the file and a plurality of outlier rows of the file, wherein an outlier row of the file represents a row of the file having one or more characteristic values with more than a threshold difference compared to the corresponding aggregate value of the characteristic;
   sampling, using a first sampling technique, to determine a set of uniform rows of the file from the plurality of uniform rows of the file;
   sampling, using a second sampling technique, to determine a set of outlier rows of the file from the plurality of outlier rows of the file;
   determining a number of rows of the file able to be displayed by the browser window on the user interface;
   determining a number of uniform rows of the set of uniform rows to be displayed, based upon (a) a difference between the number of rows able to be displayed by the browser window and a size of the set of outlier rows, and (b) a minimum number of uniform rows;
   determining a number of outlier rows of the set of outlier rows to be displayed, based upon a difference between the number of rows able to be displayed by the browser window and the determined number of uniform rows; and
   displaying, via the browser window on user interface:
      at least some of the set of uniform rows of the file sampled corresponding to the determined number of uniform rows; and
      at least some of the set of outlier rows of the file sampled corresponding to the determined number of outlier rows, wherein the outlier rows are selected in order to stratify the outlier portions across a plurality of characteristics associated with the outlier rows.

2. The method of claim 1, wherein the second sampling technique is congressional sampling, without replacement.

3. The method of claim 1, wherein at least one of the displaying steps comprises determining whether one of the sampled outlier or uniform rows of the file should be displayed before other of the plurality of the rows of the file have been classified, and displaying said one of the plurality of the rows of the file responsive to said determining.

4. The method of claim 3, wherein:
   responsive to the one of the sampled outlier or uniform rows of the file being classified as a uniform row of the file, the determining step comprises identifying whether a threshold measure of the at least some of the uniform rows of the file have been displayed; and
   wherein the displaying the one of the plurality of the rows of the file is responsive to said identifying.

5. The method of claim 3 wherein:
   responsive to the one of the sampled outlier or uniform rows of the file being classified as an outlier row of the file, the determining step comprises identifying whether a deviation of a numeric-based characteristic of the one of the sampled outlier rows of the file relative to a plurality of other of the rows of the file exceeds a threshold measure; and
   wherein displaying the one of the plurality of the rows of the file responsive to said identifying.

6. The method of claim 3 wherein:
   responsive to the one of the sampled outlier or uniform rows of the file being classified as an outlier row of the file, the determining step comprises identifying whether a deviation of a Boolean-based characteristic of the one of the sampled outlier rows of the file is exhibited by less than a threshold number of other of the plurality of rows of the file being displayed; and
   wherein displaying the one of the plurality of the rows of the file is responsive to said identifying.

7. The method of claim 1, further comprising:
   determining a size of a window of a user interface displaying data of the file; and
   determining a number of uniform rows of the file and a number of outlier rows of the file to display on the user interface based on the size of the window.

8. A computer system for displaying data of a file via a user interface, comprising a processor and a non-transitory computer useable medium storing instructions for:
   receiving a delimiter that delimits at least some of a plurality of rows of the file, each row of the file associated with values corresponding to a plurality of characteristics;
   for each of the plurality of characteristics of rows of the file, determining an aggregate value of the characteristic by aggregating characteristic values corresponding to each row of a set of rows corresponding to at least a portion of the plurality of rows of the file;
   identifying a criteria for classifying each of the plurality of rows of the file as one of a uniform row or an outlier row, the criteria comprising a comparison of each of one or more characteristic values of the row of the file with the corresponding aggregate value of the characteristic;
   classifying at least some of the plurality of rows of the file based on the identified criteria to determine a plurality of uniform rows of the file and a plurality of outlier rows of the file, wherein an outlier row of the file represents a row of the file having one or more characteristic values with more than a threshold difference compared to the corresponding aggregate value of the characteristic;

sampling, using a first sampling technique, to determine a set of uniform rows of the file from the plurality of uniform rows of the file;

sampling, using a second sampling technique, to determine a set of outlier rows of the file from the plurality of outlier rows of the file;

determining a number of rows of the file able to be displayed by the browser window on the user interface;

determining a number of uniform rows of the set of uniform rows to be displayed, based upon (a) a difference between the number of rows able to be displayed by the browser window and a size of the set of outlier rows, and (b) a minimum number of uniform rows;

determining a number of outlier rows of the set of outlier rows to be displayed, based upon a difference between the number of rows able to be displayed by the browser window and the determined number of uniform rows; and displaying, via the browser window on user interface:
at least some of the set of uniform rows of the file sampled corresponding to the determined number of uniform rows; and
at least some of the set of outlier rows of the file sampled corresponding to the determined number of outlier rows, wherein the outlier rows are selected in order to stratify the outlier portions across a plurality of characteristics associated with the outlier rows.

9. The computer system of claim 8, wherein the second sampling technique comprises congressional sampling, without replacement.

10. The computer system of claim 8, wherein the instructions are further for:
making a determination whether one of the sampled outlier or uniform rows of the file should be displayed before other of the plurality of the rows of the file have been classified, and for providing at an output an indication of such determination; and
wherein displaying one of the sampled outlier or uniform rows of the file is responsive to the indication of the determination.

11. The computer system of claim 10, wherein, the determining is in response to the one of the sampled outlier or uniform rows of the file being classified as a uniform row of the file, responsive to whether a threshold measure of the at least some of the uniform rows of the file have been displayed.

12. The computer system of claim 10 wherein, responsive to the one of the sampled outlier or uniform rows of the file being classified as an outlier row of the file, responsive to whether a deviation of a numeric-based characteristic of the one of the sampled outlier rows of the file relative to a plurality of other of the rows of the file exceeds a threshold measure.

13. The computer system of claim 10 wherein responsive to the one of the sampled outlier or uniform rows of the file being classified as an outlier row of the file, responsive to whether a deviation of a Boolean-based characteristic of the one of the sampled outlier rows of the file is exhibited by less than a threshold number of other of the plurality of rows of the file being displayed.

14. A non-transitory computer useable medium having computer readable program code embodied therein for displaying data of a file via a user interface, the computer readable program code comprising instructions that cause a computer system to:
receive a delimiter that delimits at least some of a plurality of rows of the file, each row of the file associated with values corresponding to a plurality of characteristics;
for each of the plurality of characteristics of rows of the file, determine an aggregate value of the characteristic by aggregating characteristic values corresponding to each row of a set of rows corresponding to at least a portion of the plurality of rows of the file;
identify a criteria for classifying each of the plurality of rows of the file as one of a uniform row or an outlier row, the criteria comprising a comparison of each of one or more characteristic values of the row of the file with the corresponding aggregate value of the characteristic;
classify at least some of the plurality of rows of the file based on the identified criteria to determine a plurality of uniform rows of the file and a plurality of outlier rows of the file, wherein an outlier row of the file represents a row of the file having one or more characteristic values with more than a threshold difference compared to the corresponding aggregate value of the characteristic;
sample, using a first sampling technique, to determine a set of uniform rows of the file from the plurality of uniform rows of the file;
sample, using a second sampling technique, to determine a set of outlier rows of the file from the plurality of outlier rows of the file;
determine a number of rows of the file able to be displayed by the browser window on the user interface;
determine a number of uniform rows of the set of uniform rows to be displayed, based upon (a) a difference between the number of rows able to be displayed by the browser window and a size of the set of outlier rows, and (b) a minimum number of uniform rows;
determine a number of outlier rows of the set of outlier rows to be displayed, based upon a difference between the number of rows able to be displayed by the browser window and the determined number of uniform rows; and
display, via the browser window on user interface:
at least some of the set of uniform rows of the file sampled corresponding to the determined number of uniform rows; and
at least some of the set of outlier rows of the file sampled corresponding to the determined number of outlier rows, wherein the outlier rows are selected in order to stratify the outlier portions across a plurality of characteristics associated with the outlier rows.

15. The non-transitory computer useable medium of claim 14, wherein the second sampling technique is congressional sampling, without replacement.

16. The non-transitory computer useable medium of claim 14, wherein the computer readable program code comprises instructions that cause the computer system to:
determine whether one of the sampled outlier or uniform rows of the file should be displayed before other of the plurality of the rows of the file have been classified; and
display said one of the plurality of the rows of the file are responsive to said determining.

17. The non-transitory computer useable medium of claim 16, wherein the instructions cause the computer system to:

responsive to the one of the sampled outlier or uniform rows of the file being classified as a uniform row of the file, the determining comprises identifying whether a threshold measure of the at least some of the uniform rows of the file have been displayed; and wherein displaying the one of the plurality of the rows of the file are responsive to the identifying.

18. The non-transitory computer useable medium of claim 16 wherein:

responsive to the one of the sampled outlier or uniform rows of the file being classified as an outlier row of the file, the determining comprises identifying whether a deviation of a numeric-based characteristic of the one of the sampled outlier rows of the file relative to a plurality of other of the portions of the file exceeds a threshold measure; and wherein displaying the one of the plurality of the rows of the file responsive to said determining are responsive to the identifying.

19. The non-transitory computer useable medium non-transitory computer useable medium of claim 16 wherein:

responsive to the one of the sampled outlier or uniform rows of the file being classified as an outlier row of the file, the determining comprises identifying whether a deviation of a Boolean-based characteristic of the one of the sampled outlier rows of the file is exhibited by less than a threshold number of other of the plurality of rows of the file being displayed; and wherein displaying the one of the plurality of the rows of the file responsive to said determining are responsive to the identifying.

\* \* \* \* \*

UNITED STATES PATENT AND TRADEMARK OFFICE
CERTIFICATE OF CORRECTION

PATENT NO. : 10,331,621 B1
APPLICATION NO. : 14/491956
DATED : June 25, 2019
INVENTOR(S) : Elmore et al.

Page 1 of 1

It is certified that error appears in the above-identified patent and that said Letters Patent is hereby corrected as shown below:

On the Title Page

Column 1, Assignee (73), Line 1, delete "San Francsico" and insert --San Francisco--

In the Claims

Column 19, Claim 19, Line 20, after "The", delete "non-transitory computer useable medium"

Signed and Sealed this
Fourth Day of February, 2020

Andrei Iancu
*Director of the United States Patent and Trademark Office*